(12) United States Patent
Watford et al.

(10) Patent No.: US 9,539,683 B2
(45) Date of Patent: Jan. 10, 2017

(54) POSITIVE FEED TOOL WITH INTERCHANGEABLE GEARS TO ADJUST A FEED RATE

(71) Applicant: Apex Brands, Inc., Apex, NC (US)

(72) Inventors: Jeremy Watford, Irmo, SC (US); Kevin Myhill, Lexington, SC (US)

(73) Assignee: Apex Brands, Inc., Apex, NC (US)

( * ) Notice: Subject to any disclaimer, the term of this patent is extended or adjusted under 35 U.S.C. 154(b) by 0 days.

(21) Appl. No.: 14/770,040

(22) PCT Filed: Feb. 24, 2014

(86) PCT No.: PCT/US2014/018089
§ 371 (c)(1),
(2) Date: Aug. 24, 2015

(87) PCT Pub. No.: WO2014/133976
PCT Pub. Date: Sep. 4, 2014

(65) Prior Publication Data
US 2016/0001409 A1    Jan. 7, 2016

Related U.S. Application Data

(60) Provisional application No. 61/769,736, filed on Feb. 26, 2013, provisional application No. 61/822,959, filed on May 14, 2013.

(51) Int. Cl.
| B23Q 5/32 | (2006.01) |
| B25F 5/02 | (2006.01) |
| B25F 5/00 | (2006.01) |
| B23Q 5/26 | (2006.01) |
| B25B 21/00 | (2006.01) |

(Continued)

(52) U.S. Cl.
CPC ............. *B23Q 5/326* (2013.01); *B23Q 5/261* (2013.01); *B23Q 5/263* (2013.01); *B23Q 5/265* (2013.01); *B23Q 11/04* (2013.01); *B25B 21/00* (2013.01); *B25F 3/00* (2013.01); *B25F 5/00* (2013.01); *B25F 5/001* (2013.01); *B25F 5/02* (2013.01); *F16K 1/34* (2013.01); *F16K 27/02* (2013.01); *F16K 31/1225* (2013.01)

(58) Field of Classification Search
CPC ........... B23Q 5/326; B23Q 5/261; B23Q 5/32; B25F 5/001; B25F 5/02
USPC .................................. 173/216; 408/124, 137
See application file for complete search history.

(56) References Cited

U.S. PATENT DOCUMENTS

| 1,312,644 A | 8/1919 | Raab et al. |
| 2,393,272 A * | 1/1946 | Deventer ............... G11B 31/00 379/78 |

(Continued)

FOREIGN PATENT DOCUMENTS

| CN | 201093036 Y | 7/2008 |
| CN | 101377229 A | 3/2009 |

(Continued)

*Primary Examiner* — Michelle Lopez
(74) *Attorney, Agent, or Firm* — Coats & Bennett, P.L.L.C.

(57) ABSTRACT

A positive feed tool that includes a spindle that is axially moved along a feed path to perform work on a workpiece. The tool includes a gear head with a plurality of gears configured to rotate and axially move the spindle. The gear head is designed to change the changing gears within the gear head to change feed rates on the spindle. The gears can be interchanged without a complete disassembly of the gear head.

12 Claims, 10 Drawing Sheets

(51) Int. Cl.
  *B23Q 11/04*   (2006.01)
  *B25F 3/00*    (2006.01)
  *F16K 1/34*    (2006.01)
  *F16K 27/02*   (2006.01)
  *F16K 31/122*  (2006.01)

(56) References Cited

U.S. PATENT DOCUMENTS

| | | | |
|---|---|---|---|
| 2,893,272 A | | 7/1959 | Linsker |
| 3,411,385 A | | 11/1968 | Quackenbush |
| 3,577,807 A | * | 5/1971 | Alexander ............ B23B 45/04 |
| | | | 408/17 |
| 4,538,942 A | * | 9/1985 | Vindez .................. B23Q 5/326 |
| | | | 173/146 |
| 5,860,446 A | | 1/1999 | Hunt |
| 7,806,637 B2 | | 10/2010 | Oehninger et al. |
| 8,469,641 B2 | | 6/2013 | Jaillon |
| 2008/0260485 A1 | | 10/2008 | Jaillon et al. |

FOREIGN PATENT DOCUMENTS

| | | |
|---|---|---|
| EP | 0060186 A2 | 9/1982 |
| EP | 1618978 A1 | 1/2006 |
| EP | 1916045 A1 | 4/2008 |
| FR | 2881366 A1 | 8/2006 |
| GB | 2195164 A | 3/1988 |
| WO | 0078502 A2 | 12/2000 |
| WO | 0105559 A2 | 1/2001 |

* cited by examiner

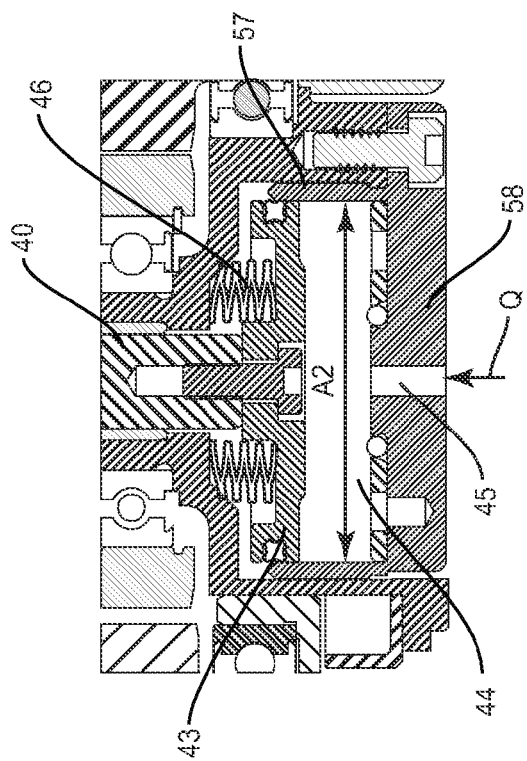
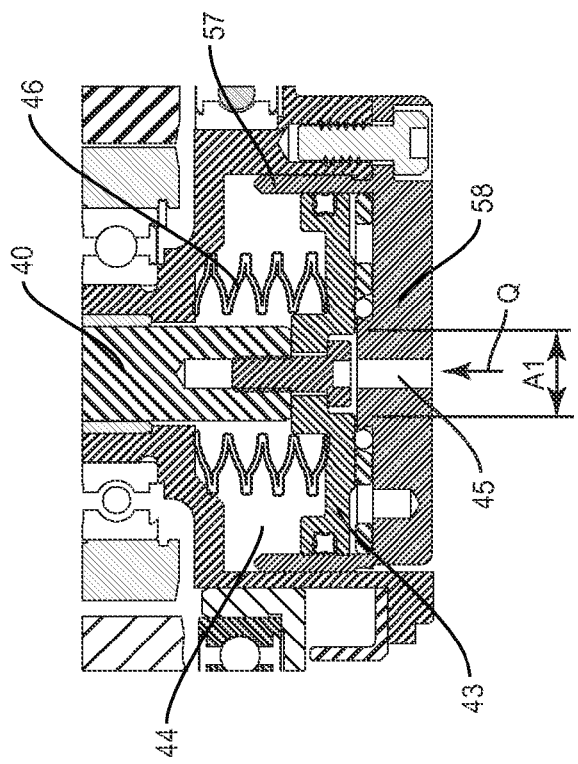

POSITIVE FEED TOOL WITH INTERCHANGEABLE GEARS TO ADJUST A FEED RATE

RELATED APPLICATIONS

The present application claims priority to U.S. application Ser. No. 61/769,736 filed on Feb. 26, 2013 titled Feed Drill and U.S. application Ser. No. 61/822,959 filed on May 14, 2013 titled Feed Drill.

BACKGROUND

The present application is directed to tools that provide for moving a spindle in both advance and retract feed directions and specifically to tools with interchangeable gears to adjust a feed rate of the spindle.

Positive feed tools, such as but not limited to feed drills, are conventionally known for performing operations on workpieces formed of substances such as steel, aluminum, titanium, and composites. Positive feed tools include a tool feed mechanism that feeds a bit into a work piece. Conventional applications for positive feed tools include, among other applications, drilling holes in various parts of aircraft.

Positive feed tools generally include a motor that drives gears in a gear head to move a spindle. The various gears in the gear head are configured to control the feed rate of the spindle. The feed rate is set to suit different hole sizes in different materials. Prior tools have required the entire gear head to be disassembled and one or more of the gears to be replaced in order to change the feed rate. This is a cumbersome task that is timely and sometimes difficult to complete. Further, disassembly of the complete gear head can affect the overall life of the tool. Other designs have included additional gears in the gear head. However, the additional gears add weight, size, and complexity to the tool. Further, these gear heads are often more expensive.

SUMMARY

The present application is directed to positive feed tools and methods of use that are able to adjust a feed rate of a spindle. The tools and methods include interchangeable feed gears that are each configured to engage with another gear in the tool. The different feed gears include different numbers of teeth to provide different feed rates. This design uses a minimum number of gears yet still allows the feed rate to be changed without completely dismantling the gear head.

One embodiment is directed to a positive feed tool that includes a housing that extends around an interior space, a spindle connected to the housing and movable relative to the housing along a feed path that extends through the housing, a spindle rotation mechanism positioned in the interior space of the housing and connected to the spindle to rotate the spindle. The tool also includes a differential feed gear positioned in the interior space of the housing and driven by the spindle rotation mechanism. The differential feed gear includes gear teeth along an outer periphery. A mount position is located in the interior space at the differential feed gear and the spindle. An opening in the housing extends into the interior space. The tool also includes first and second spindle feed gears each configured to connect to the spindle and each including gear teeth positioned along an outer periphery to engage with the gear teeth of the differential feed gear. Each of the spindle feed gears include a connector to connect to the spindle and each of the spindle feed gears being sized to fit through the opening in the housing. The mount position is sized to receive one of the spindle feed gears. With the first spindle feed gear mounted at the mount position and connected to the spindle and the differential feed gear, the first spindle feed gear includes a number of teeth and gear profile to move the spindle along the feed path at a first rate when the first spindle gear is rotated by the differential feed gear at a first speed. With the second spindle feed gear mounted at the mount position and connected to the spindle differential feed gear, the second spindle feed gear includes a different second number of teeth and gear profile to move the spindle along the feed path at a different second feed rate when the second spindle gear is mounted in the mount position and rotated by the differential feed gear at the first speed.

The opening may be positioned in closer proximity to the mount position than the spindle rotation mechanism and the differential feed gear.

The feed tool may further include a cover removably attached to the housing with the cover sized to extend across the opening.

The cover may extend across the feed path and the spindle may extend through an opening in the cover.

The feed tool may further include a biasing member positioned in the interior space between the cover and the mount position. The biasing member may be configured to apply a biasing force to the one of the first and second spindle feed gears that is located at the mount position.

The feed tool may include a cam mechanism positioned in the interior space between the cover and the mount position. The cam mechanism may be configured to applying an oscillating force to the spindle during rotation of the spindle.

Another embodiment is directed to a method of operating a positive feed tool. With a first spindle feed gear and a differential feed gear positioned within a housing of the feed tool and first gear teeth of the first spindle feed gear engaged with gear teeth of a differential feed gear and the first spindle feed gear connected to a spindle, the method includes rotating the differential feed gear at a first speed thereby rotating the first spindle feed gear and causing the spindle to move along a feed path at a first rate. The method includes removing the first spindle feed gear through an opening in the housing while the differential feed gear remains positioned within the housing. The method includes inserting a second spindle feed gear through the opening in the housing and engaging second gear teeth of the second spindle feed gear with the gear teeth of the differential feed gear and connecting the second spindle feed gear to the spindle. The method includes rotating the differential feed gear at the first speed thereby rotating the second spindle feed gear and causing the spindle to move along the feed path at a second feed rate that is different than the first feed rate.

The method may further include removing the first spindle feed gear through an opening in the housing while a spindle drive mechanism remains within the housing.

The method may further include removing a biasing member from the interior space through the opening and inserting a replacement biasing member into the interior space. The replacement biasing member applies a different biasing force than the biasing member.

The method may further include rotating the first spindle feed gear around the spindle and removing the first spindle feed gear through the opening.

The method may further include maintaining the differential feed gear axially engaged with a drive gear while removing the first spindle feed gear through the opening and inserting the second spindle feed gear through the opening.

The method may further include moving the spindle along the feed path and contacting a depth stop connected to the spindle against a stop member connected to the cover.

The various aspects of the various embodiments may be used alone or in any combination, as is desired.

BRIEF DESCRIPTION OF THE DRAWINGS

FIG. 9A is a side sectional view of a piston in a first position across an inlet with the tool in a forward feed operation.

FIG. 9B is a side sectional view of a piston in a second position spaced away from the inlet with the tool in a retract operation.

DETAILED DESCRIPTION

The present application is directed to a positive feed tool that includes a spindle that is axially moved to perform work on a workpiece. The tool includes a gear head with a plurality of gears configured to rotate and axially move the spindle. The tool provides for changing gears within the gear head to change feed rates on the spindle. The gears can be interchanged without a complete disassembly of the gear head.

Figure 1:
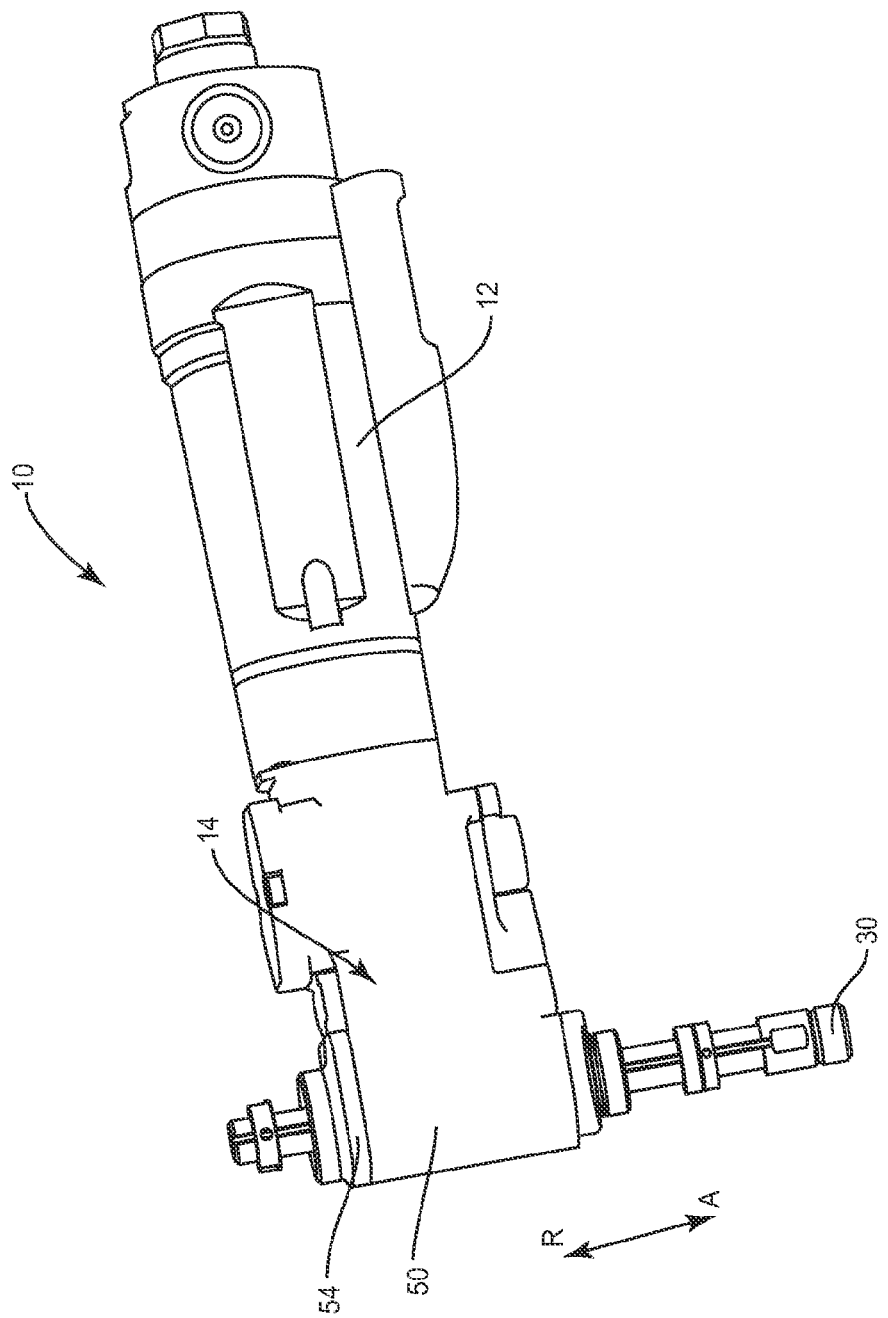
FIG. 1 is a perspective view of a right-angle positive feed tool.
Figure 2:
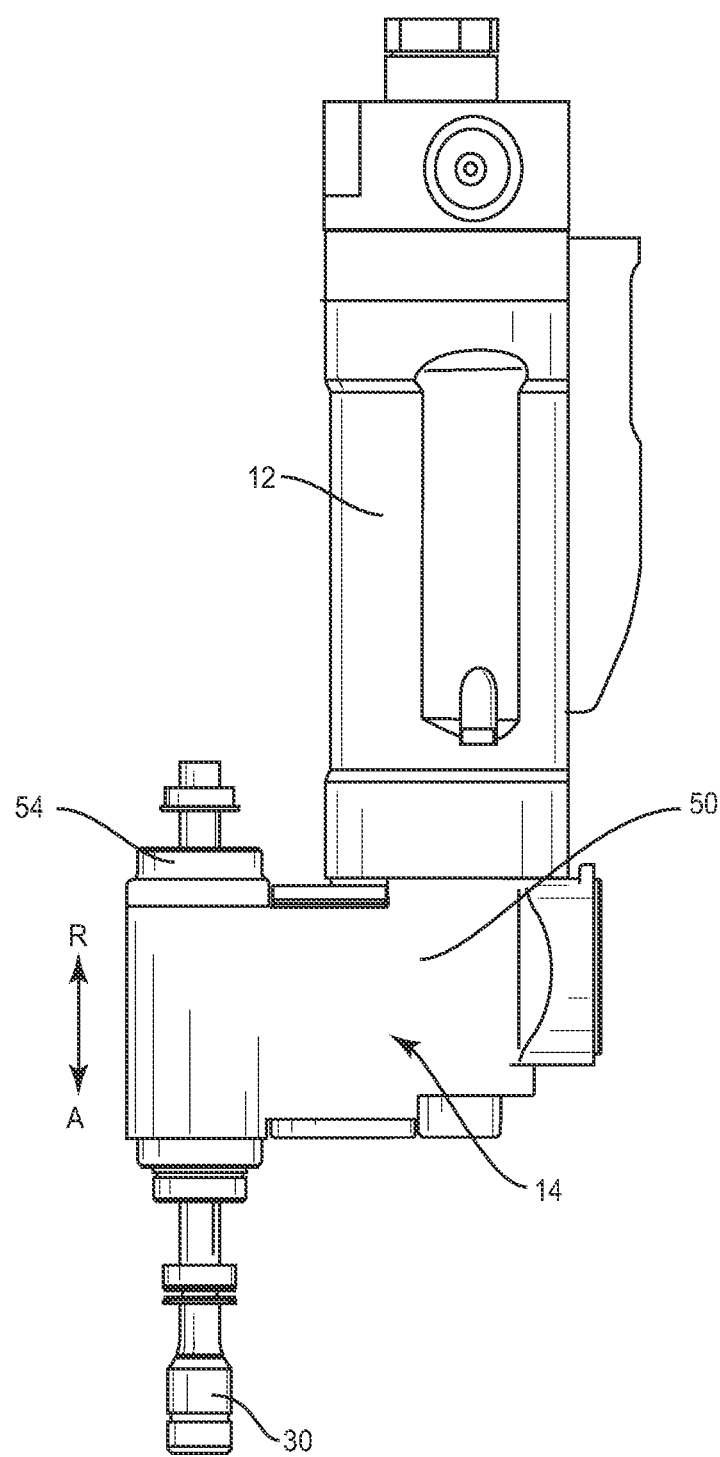
FIG. 2 is a perspective view of an in-line positive feed tool.

FIG. 1 illustrates an example of a right-angle positive feed tool 10, and FIG. 2 shows an inline configuration of a positive feed tool. Right angle and inline refer to the position of a motor 12 relative to an axis of a spindle 30. The positive feed tool 10 generally includes a gear head 14 with a spindle 30 that, in addition to rotating, advances a predetermined amount per revolution toward the workpiece to be drilled. The gear head 14 is positioned in a housing 50 that extends around the various gears provided for moving the spindle 30. The spindle 30 is designed to move in the advance or forward direction A towards a workpiece and in a retract (i.e., reverse) direction R away from the workpiece. The motor 12 is configured to apply power to the gear head 14 to rotate the gears. The motor 12 may be powered by air, fluid hydraulics, or an electric motor. In one or more embodiments that include an air motor 12, a pressurized air source (not illustrated) provides the air to power the gear head 14 and thus rotate the spindle 30.

Figure 3:
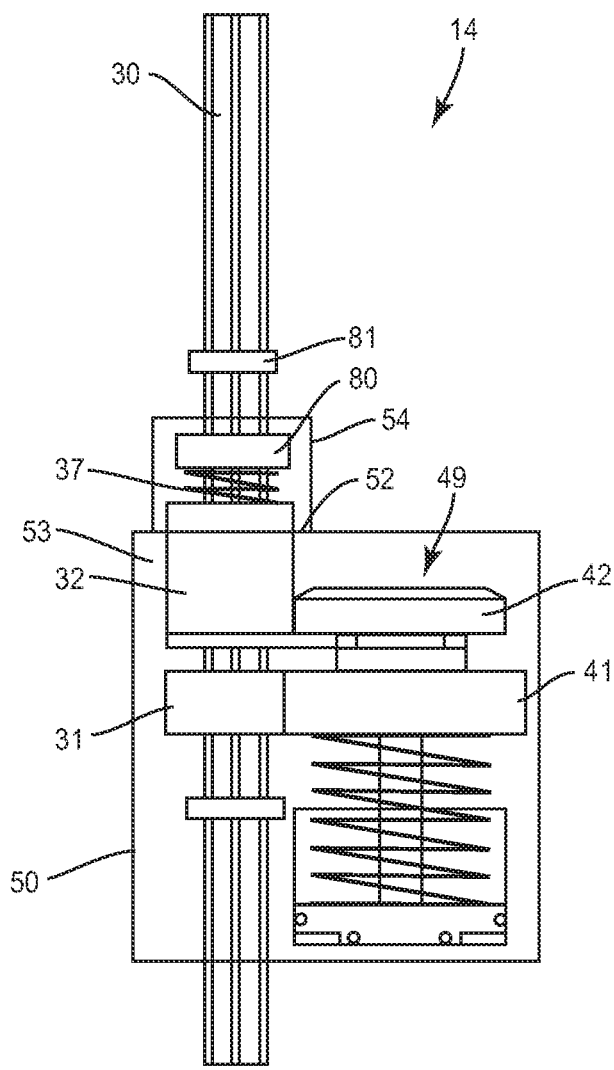
FIG. 3 is a schematic side view of components of a positive feed tool.

FIG. 3 schematically illustrates a gear head 14 that includes an exterior housing 50. The gear head 14 includes a variety of gears and drive mechanisms to move the spindle 30 including a spindle rotation mechanism including a differential drive gear 41 and a spindle drive gear 31, a differential feed gear 42, and a spindle feed gear 32. A cover 54 extends across an opening in the housing 50 and is removable to access and replace the spindle feed gear 32 thus changing the feed rate of the spindle 30. This design provides for changing the feed rate without a complete disassembly of the gear head 14 and maintaining the integrity of a remainder of the gear head 14.

The spindle feed gear 32 extends around the spindle 30 and includes gear teeth that are engaged with corresponding teeth on the differential feed gear 42. The design uses a profile shift between the differential feed gear 42 and the spindle feed gear 32 to have multiple gear ratios on the same centers within established design limits. For a set of ratios, the number of gear teeth on the differential feed gear 42 is maintained the same but the number of teeth on the spindle feed gear 32 are varied. This allows the differential feed ratio to be varied and the feed rate to be changed by just changing the spindle feed gear 32.

Figure 4:
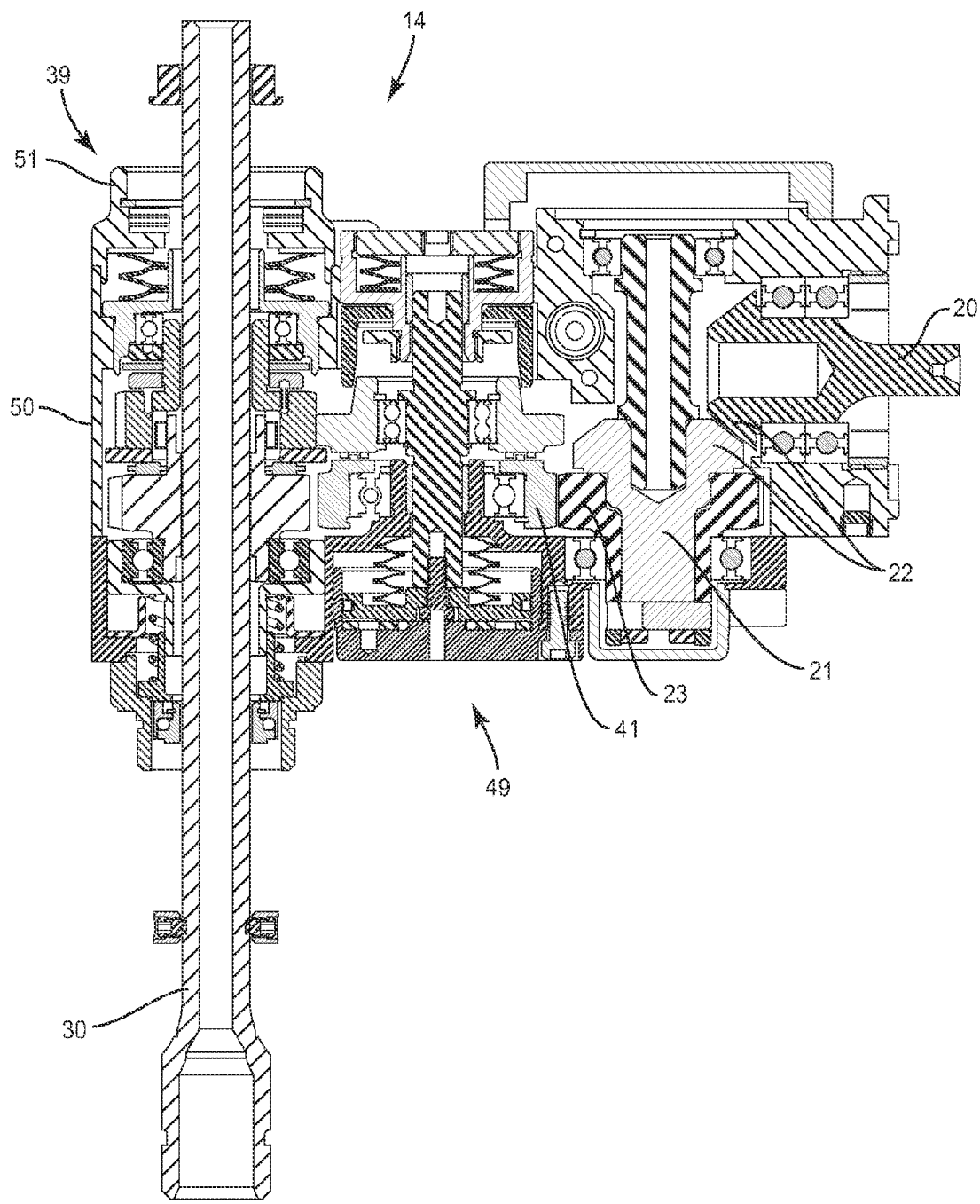
FIG. 4 is a side sectional view of a gear head.

The gear head 14 is mounted to and powered through the motor 12. FIG. 4 illustrates a side schematic view of a right angle feed gear head 14 separated from the motor 12 (not illustrated in FIG. 4). The gear head 14 includes an input shaft 20 that is driven by the motor 12. A set of bevel gears 22 is employed to provide rotation to an input gear 23 that is operatively connected to a differential unit 49 which in turn drives a spindle unit 39 that includes the spindle 30. A similar configuration is used for an inline tool with the input gear 23 being driven directly by the motor 12 or either directly or through reduction gear boxes commonly called planetary gear boxes. For both a right angle gear head 14 and inline gear head 14, the spindle unit 39 and differential unit 49 are substantially the same. Further, the housing 50 is substantially the same.

Figure 5:
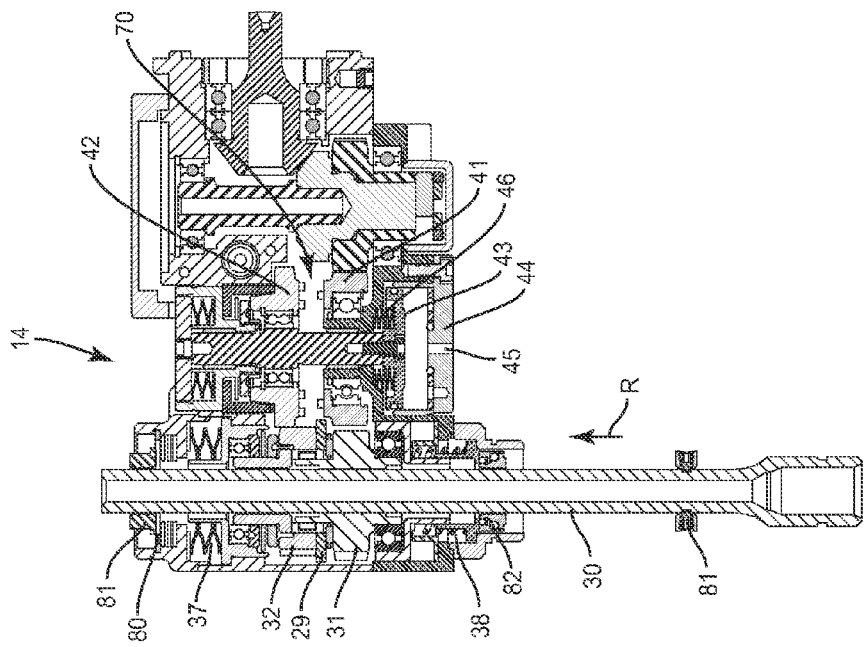
FIG. 5 is a side sectional view of a gear head in a forward feed operation.
Figure 6:
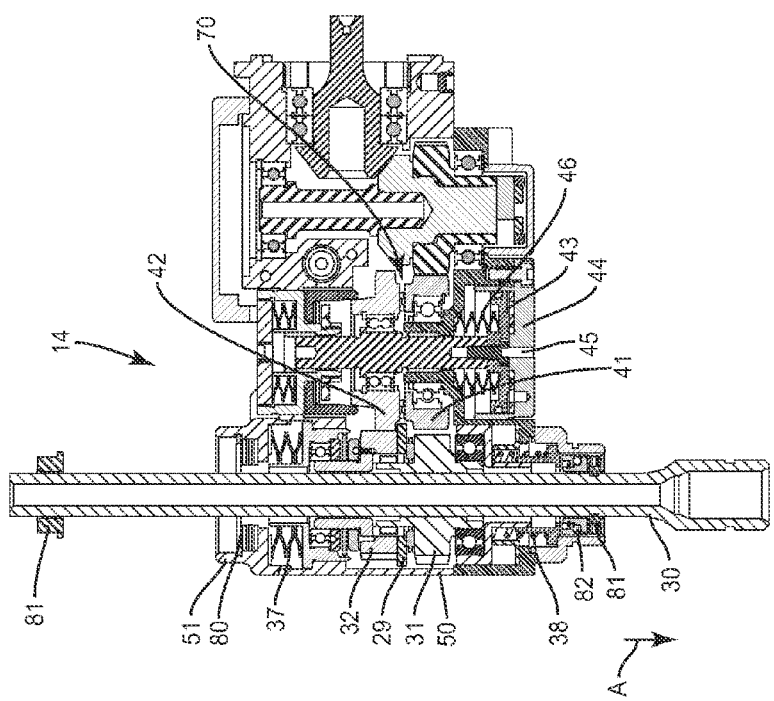
FIG. 6 is a side sectional view of a gear head in a retract operation.

As illustrated in FIGS. 5 and 6, the differential unit 49 is powered through the motor 12 and engages with and drives the spindle unit 39. The spindle unit 39 includes one or more of the spindle 30, spindle drive gear 31, and a spindle feed gear 32. The differential unit 49 includes one or more of the differential drive gear 41, differential feed gear 42, and a feed shaft 40. The units 39, 49 are generally aligned with the spindle 30 being parallel to the feed shaft 40.

The spindle 30 is an elongated member that includes one or more slots for engagement with the drive gear 31 and threads for engagement with the feed gear 32. A distal end of the spindle 30 is configured to receive a tool bit for performing operations on the workpiece. One or more depth stop members 81 may be attached to the spindle 30 to control an extent of axial movement of the spindle 30 in the advance and retract directions. The depth stops 81 are attached to the spindle 30 and move axially with the spindle 30. In one or more embodiments, the depth stops 81 are collars that are threaded onto the spindle 30. The depth stops 81 extend radially outward from the spindle 30 and are sized to contact against a respective contact member 82 to prevent additional axial movement of the spindle 30. To prevent damage, one or both of the contact members 82 may include a bearing at the point at which the spindle 30 can no longer be driven forward.

In one or more embodiments as illustrated in FIGS. 5 and 6, the spindle 30 includes two stops 81: a depth stop 81 at an upper portion of the spindle 30, and a home/retract stop 81 at a lower portion of the spindle 30. These stops 81 provide the limits for operation of the spindle stroke. A first depth stop 81 is positioned along a proximal section of the spindle 30 to control an extent of movement in the forward direction. The depth stop 81 contacts against a contact member 82 at a top of the gear head 14 to prevent additional axial movement in the forward direction. The second home/retract stop 81 is positioned along a distal section of the spindle 30 to control an extent of reverse movement. This home/retract stop 81 contacts against a contact member 82 at a lower portion of the gear head 14.

In one or more embodiments, the gear head 14 is configured to accommodate over-travel of the spindle 30 in the reverse direction. The contact member 82 may be movably attached to a housing of the gear head 14. A biasing member 38 biases the contact member 82 outward away from the housing. In the event the stop member 81 contacts against the contact member 82 while the spindle 30 is still moving in the reverse direction, the contact member 82 is able to move axially inward towards the housing against the force of the biasing member 38. This additional over-travel distance provides for additional axial movement of the spindle 30 after the depth stop 81 has contacted against the contact member 82.

The spindle drive gear 31 and spindle feed gear 32 each include an annular shape with a central opening to receive the spindle 30. The spindle feed gear 32 includes internal threads that are threaded onto external threads that extend along the length of the spindle 30. Hence, when the spindle feed gear 32 is rotated in relation to the spindle 30, the spindle 30 will feed in the advance direction through the spindle feed gear 32. In one or more embodiments, external threads of the spindle 30 are left-handed threads. The spindle 30 also includes slots that extend along its length. The spindle drive gear 31 includes internal male splines that engage with the drive grooves on the spindle 30. Thus, when the spindle drive gear 31 is rotated, the spindle 30 also rotates. Teeth extend around the outer periphery of each gear 31, 32 to engage with corresponding teeth in the gears of the differential unit 49. A biasing member 37 is positioned to force the spindle feed gear 32 towards the spindle drive gear 31.

In the differential unit 49, each of the drive gear 41 and feed gear 42 extend around the feed shaft 40 and include teeth around their periphery to respectively engage with the corresponding gears 31, 32 of the spindle unit 39. The differential feed gear 42 is attached to the feed shaft 40 and axially moves with the feed shaft 40. The differential drive gear 41 extends around the feed shaft 40 but does not axially move with the feed shaft 40 (i.e., the feed shaft 40 slides through a central opening in the differential drive gear 41).

A piston 43 is attached to the feed shaft 40 and axially moves with the feed shaft 40. The piston 43 is positioned within the interior of a cylinder 44 and is sized to extend across the cylinder 44. An inlet 45 is positioned at a bottom of the cylinder 44. The inlet 45 is sized to include a smaller area than the cross-sectional size of the cylinder 44. A biasing member 46 extends along the feed shaft 40 between the piston 43 and the differential drive gear 41. The biasing member 46 biases the piston 43 towards the inlet 45.

The differential drive gear 41 is driven through the motor 12. Differential drive gear 41 engages with drive gear 31 which is operatively connected to the spindle 30 to thereby provide rotation to the spindle 30. The differential drive gear 41 is also operatively connected to and rotates the differential feed gear 42. The differential feed gear 42 engages with the spindle feed gear 32 which is threaded onto the spindle 30. The feed gears 32, 42 provide for the spindle 30 to move in the advance and retract directions with the rate and direction of feed based on ratios between the drive gear 41/drive gear 31 and the feed gear 42/feed gear 32. In one or more embodiments, the thread on the spindle 30 is made left hand such that feed in the advance direction is achieved by rotating the spindle feed gear 32 faster than the spindle drive gear 31.

In another embodiment, the spindle 30 is made right-handed such that the feed in the advance direction is achieved by rotating the spindle feed gear 32 slower than the spindle drive gear 31.

To move the spindle 30 in the retract direction the differential feed gear 42 is disengaged from the differential drive gear 41. As the differential feed gear 42 is not otherwise driven, the differential feed gear 42 becomes stationary. Because the feed gear 32 is driven through the feed gear 42, the spindle feed gear 32 also becomes stationary. With the spindle 30 still being driven by the spindle drive gear 31 (through the differential drive gear 41), the spindle 30 is caused to retract due to the threads along the length of the spindle 30 that are engaged in the now stationary spindle feed gear 32.

The tool 10 may include various manners of disengaging the differential feed gear 42 from the differential drive gear 41. The disengagement includes that the differential feed gear 42 and differential drive gear 41 move axially apart. This may include one or more of a torque overload clutch 70 between the differential feed gear 42 and the differential drive gear 41, a mechanical lift ring 29 that moves the differential feed gear 42, and a two-stage piston 43. In one or more embodiments, the tool 10 includes each of these aspects. Other embodiments include the feed tool 10 having just a single one of these aspects. Still other embodiments may include the feed tool 10 having two or more of these aspects. In one specific embodiment, the tool 10 includes a lift ring 29 and a two-stage piston 43. In another specific embodiment, the tool 10 includes a torque overload clutch 70 and a two-stage piston 43.

The torque overload clutch 70 is one manner to shift the tool 10 between forward and retract operations. The clutch 70 includes matching ramps 85 on the contact faces of the differential drive gear 41 and differential feed gear 42. The ramps 85 mate together for the drive gear 41 to rotate the feed gear 42. The force of the biasing member 46 maintains engagement between the ramps 85 on the opposing gears 41, 42.

Figure 7:
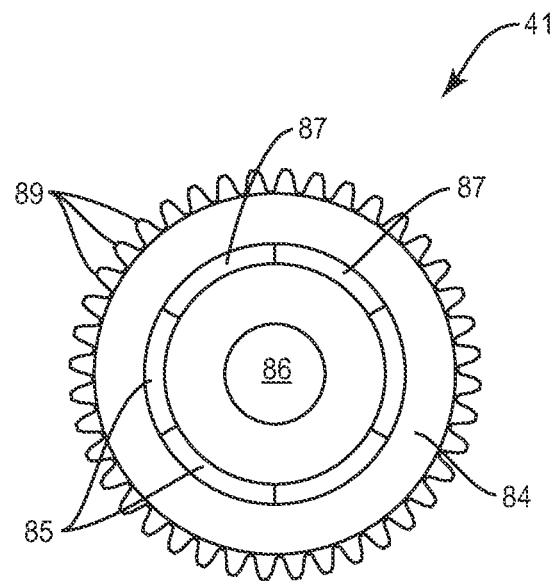
FIG. 7 is a top view of a differential drive gear with ramps that form a portion of a threshold clutch.
Figure 7A:
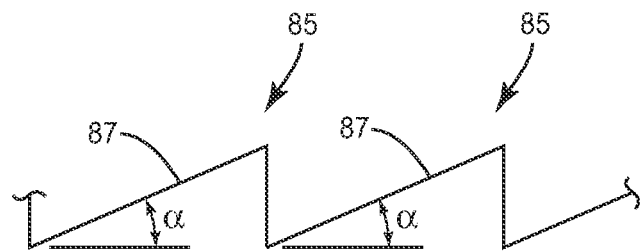
FIG. 7A is a side view of two of the ramps of FIG. 7.

FIG. 7 illustrates a top view of the differential drive gear 41 that includes a circular cross sectional shape. A central opening 86 is sized to receive the feed shaft 40. The axial face 84 that faces towards the differential feed gear 42 includes ramps 85 that each includes a sloped cam face 87 as best illustrated in FIG. 7A. The cam faces 87 are aligned at an angle $\alpha$ with the axial face 84. The angle $\alpha$ may vary depending upon the extent of necessary engagement. In one or more embodiments, the ramps 85 extend completely around the central opening 86. Other embodiments may include different numbers and configurations of ramps 85. The differential feed gear 42 includes a similar configuration with corresponding ramps 85 that mate together. The ramps 85 on the opposing gears 42, 41 may include the same or different angles $\alpha$.

Figure 8:
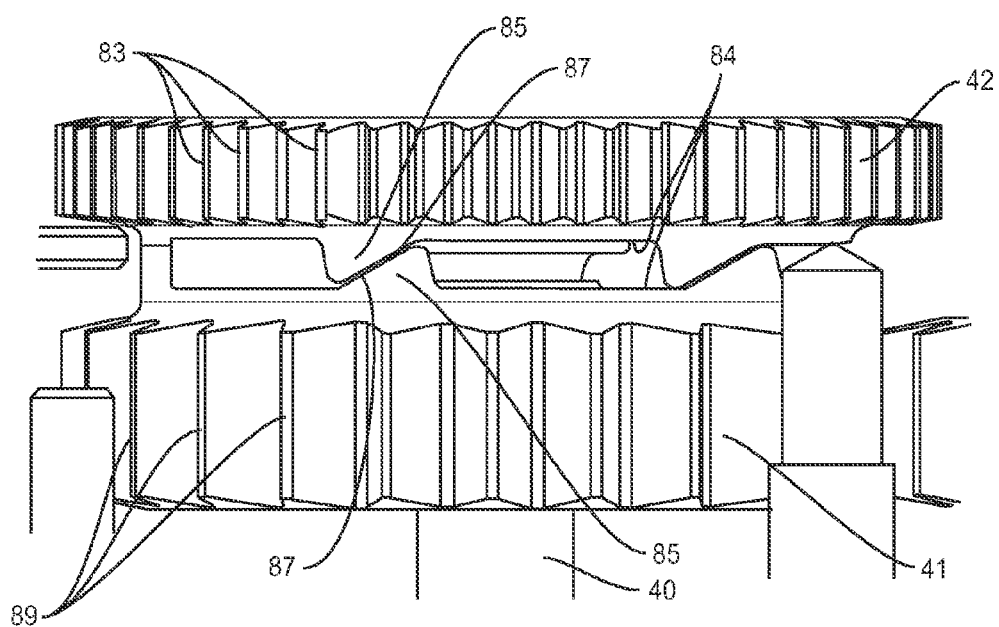
FIG. 8 is a side perspective view of a threshold clutch formed between a differential drive gear and a differential feed gear.

FIG. 8 illustrates the differential drive gear 41 and feed gear 42 mated together, such as when the tool 10 is operating in the advance direction. The cam faces 87 of the opposing ramps 85 contact together for the drive gear 41 to rotate the feed gear 42. The drive gear 41 also includes the gear teeth 89 along the periphery that engage with corresponding teeth on the spindle drive gear 31. Likewise, the feed gear 42 includes peripheral teeth 83 that engage with teeth on the spindle feed gear 32. The ramps 85 are held in contact at least by the biasing force applied to the gears 41, 42 by the biasing member 46. In the event that the differential feed gear 42 cannot be driven, then the two gears 41, 42 will separate along the axis of the differential feed shaft 40. The amount of torque for overload to cause the separation is a function of the force applied by the biasing member 46 and the angle α of the cam faces 87.

When the tool 10 is operating in the forward direction as illustrated in FIG. 5, the differential feed gear 42 is coupled to the differential drive gear 41 through the clutch 70 that includes the matching ramps 85 that are held in contact by the bias force of the biasing member 46. The spindle feed gear 32 rotates at a differential speed relative to the spindle drive gear 31 hence causing the spindle 30 to advance. At the extent of movement of the spindle 30 in the advance direction, additional movement of the spindle 30 is stopped through the upper depth stop member 81 contacting against the contact member 82. At the contact between the depth stop 81 and the contact member 82, the drive to the spindle feed gear 32 is still occurring from the differential feed gear 42 (through the differential drive gear 41). As the spindle 30 is prevented from moving axially forward but is still being rotated through the spindle drive gear 31, the spindle feed gear 32 that is threaded onto the spindle 30 moves axially backwards along the spindle 30. This movement causes the spindle feed gear 32 to move against the biasing member 37. This structure is developed for "thrust overload" and is of particular advantage for tools that are used for countersinking where a small dwell period at the end of the spindle stroke is greatly advantageous for accurate countersink depth and maintaining a clean finish on the countersink form.

In one or more embodiments, the biasing member 37 includes one or more Belleville washers, wave springs, magnets, and compression springs. The member 37 has a preload approximately equal to the thrust rating of the gear head 14. The backward movement of the spindle feed gear 32 along the spindle 30 causes the gear 32 to move against the biasing member 33. This results in additional torque being needed through the differential feed gear 42 to rotate the spindle feed gear 32. This additional torque in return requires additional torque to be supplied by the differential drive gear 41. The additional torque required between the differential drive and feed gears 41, 42 causes the cam faces 87 to slide against each other and for the gears 41, 42 to axially separate and to disengage. The disengagement causes the differential feed gear 42 and thus the spindle feed gear 32 to each become stationary. The rotation of the spindle 30 through the stationary feed gear 32 results in the spindle 30 to begin to move in the retract direction.

In another embodiment, or in combination with the clutch 70, the spindle feed gear 32 includes a lift ring 29. As illustrated in FIGS. 5 and 6, the ring 29 extends radially outwardly beyond the teeth of the spindle feed gear 32 and under the differential feed gear 42. When the spindle 30 is moving in the forward direction, the lift ring 29 extends below the bottom axial face of the differential feed gear 42. At the end of stroke or thrust overload condition the spindle feed gear 32 moves backward as described above. As the spindle feed gear 32 moves axially along the spindle 30, the lift ring 29 acts on the differential feed gear 42 and moves the lift ring 29 away from the differential drive gear 31.

In one or more embodiments, the lift ring 29 may be attached to the spindle feed gear 32. The lift ring 29 and feed gear 32 may be formed as an integral part, such as being molded together as a single, unitary construction. The lift ring 29 may also be attached to the underside of the feed gear 32 through one or more mechanical fasteners and/or adhesives. The lift ring 29 may also be a separate element that is held in contact against the underside of the feed gear 32 by the biasing member 38.

In one or more embodiments, the torque clutch 70 and/or lift ring 29 axially move the differential feed gear 42 a limited amount to disengage from the differential drive gear 41. The piston 43 may be further configured to provide additional axial movement of the differential feed gear 42. The piston 43, feed shaft 40, and differential feed gear 42 are connected together to axially move as a unit. As illustrated in FIGS. 9A and 9B, the piston 43 is positioned in the cylinder 44 that includes the outer walls 57 and a bottom wall 58. The cross-sectional shape of the cylinder 44 matches the piston 43 such that the piston 43 extends across the cylinder 44 and the piston 43 is able to move axially within the cylinder 44. The bottom wall 58 includes the inlet 45 that provides for introduced air to act on an area A1 of the piston 43 that is less than the area of the cylinder 44. Air from an air logic system is moved in the direction of arrow Q into the inlet 45.

When the tool 10 is operating in the forward direction as illustrated in FIG. 9A, the piston 43 is positioned at the bottom wall 58 and extends over the inlet 45. Thus, the air acts on just the portion of the piston 43 equal to area A1 that is exposed through the inlet 45. The force of the biasing member 46 pressing downward on the piston 43 is greater than the force exerted by the air on the reduced area A1 of the piston 43. Thus, the piston 43 (and the attached feed shaft 40 and differential feed gear 42) remain in the same axial position.

Once the movement of the differential feed gear 42 is initiated through the lift ring 29 and/or threshold clutch 70, the piston 43 also moves axially in the cylinder 44 away from the bottom wall 58 as it is coupled to the differential feed gear 42 through the differential feed shaft 40. The bottom of the piston 43 moves away from the inlet 45 thus allowing air to act on a larger area A2 of the piston 43. This results in a larger force being supplied through the air. The larger force overcomes the biasing member 46 and axially moves the piston 43 and thus also moves the differential feed gear 42 into contact with a holding mechanism. The use of air to move the piston 43 greatly reduces the time to shift the differential feed gear 42 from the forward position to the retract position. This also greatly reduces the possibility of jamming.

Figure 10:
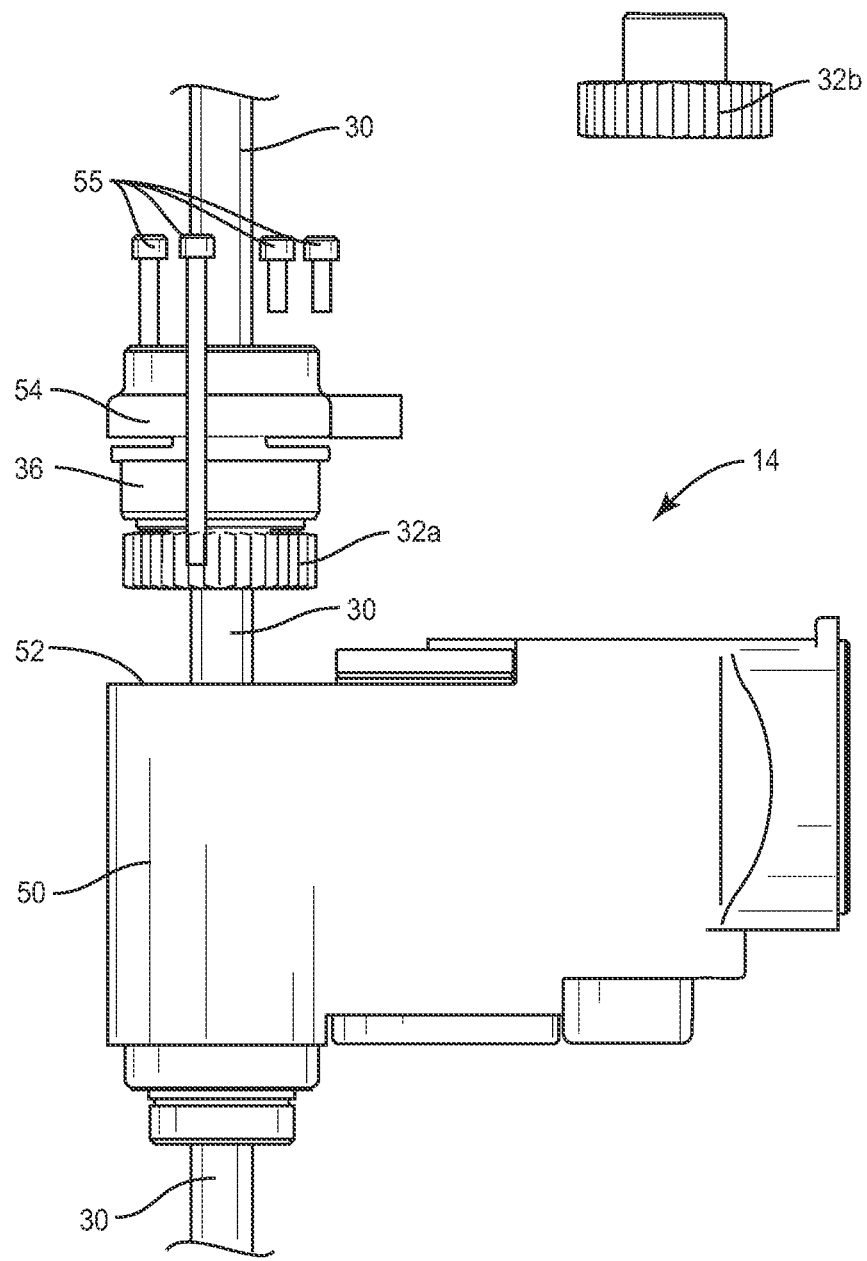
FIG. 10 is an exploded perspective view of a spindle feed gear with interchangeable gears.

As illustrated in FIG. 10, the housing 50 extends around the exterior of the gear head 14. The housing 50 forms a protected interior space sized to contain the differential unit 49 and the spindle unit 39. Further, the spindle 30 extends through the housing 50 in a manner to allow for relative rotation and axial movement of the spindle 30. The housing 50 may be constructed from a variety of different materials, including but not limited to plastic and various metals.

An opening 52 extends through the housing for accessing, removing, and replacing the spindle feed gear 32. The opening 52 is larger than the spindle feed gears 32 that are used in the gear head 14. This larger sizing allows an operator to remove a first spindle feed gear 32 mounted in the interior space, and insert a second spindle feed gear 32 and mount it in the interior space. The opening 52 may include a variety of different shapes and sizes provided it allows for insertion and removal of the various spindle feed gears 32.

As illustrated in FIG. 1, the opening 52 is located to access a mounting position 53 within the interior space where the spindle feed gear 32 is mounted. In one or more embodiments, the spindle drive gear 31, differential feed gear 42, and differential drive gear 41 remain mounted in the gear head 14. Therefore, the opening 110 is located in closer proximity to the mounting position 53 than to these gears for accessing and removing the spindle feed gear 32.

In one or more embodiments as illustrated in FIG. 10, the opening 52 is located at the spindle 30 (i.e., the spindle 30 extends through the opening 52). The spindle 30 may remain substantially attached to the housing 100 during removal of the spindle feed gear 32. Positioning the opening 52 at the spindle 30 allows for the spindle feed gear 32 to be rotated about the spindle 30 to be unthreaded and removed from the interior space. In a like manner, another spindle feed gear 32 may be inserted by threaded the new gear 32 onto the spindle 30 and rotating the gear 32 to move it axially along the spindle 30, through the opening 52 and into position at the mounting position 53.

A cover 54 is removably attached to the housing 50 and sized to extend over an entirety or part of the opening 52. The cover 54 may be attached to the housing 50 with one or more fasteners 55, such as screws or bolts. In one or more embodiments in which the opening 52 is located at the spindle 30, the cover 54 includes an opening to receive the spindle 30. Thus, the spindle 30 extends through the interior space of the housing 50 and through the opening in the cover 54. The cover 54 may be constructed from a variety of materials, including plastic and various metals.

Figure 11:
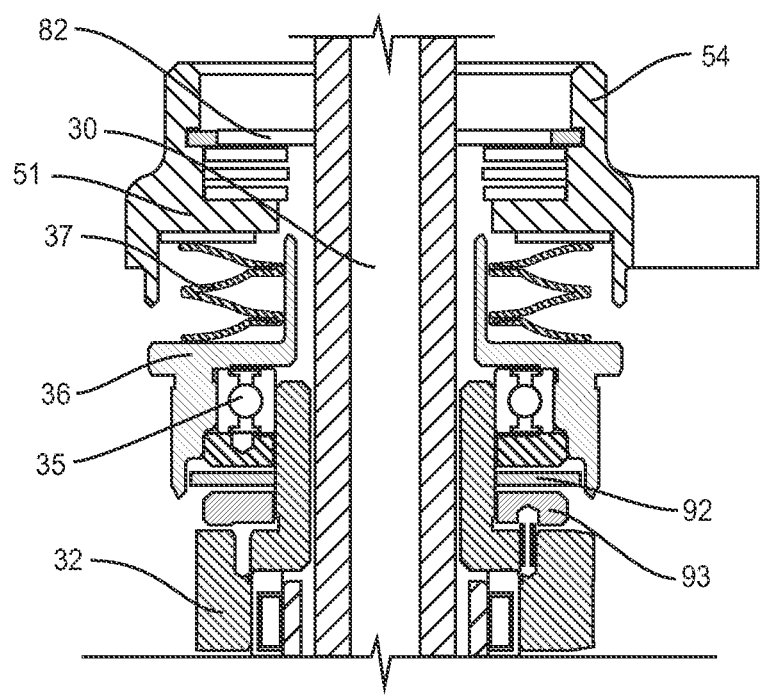
FIG. 11 is a side sectional view of a portion of a gear head that includes a cover.

As illustrated in FIG. 11, the cover 54 includes a cross member 51 that extends across a portion or entirety of the width. A upper surface of the cross member 51 provides a seat for positioning the upper contact member 82 that provides a depth stop for the upper stop member 81 that is attached to the spindle 30. A lower surface of the cross member 51 provides a seat for the biasing member 37 that acts against the spindle feed gear 32 and provides the thrust overload force. An annular member 36 may be positioned between the biasing member 37 and the spindle feed gear 32. The force applied by the biasing member 37 is applied to the spindle feed gear 32 through the annular member 36. The annular member 36 may be mounted on a bearing 35 such that the annular member 36 does not rotate with the gear 32.

In one or more embodiments, a cam member 93 is operatively connected to and rotates with the spindle feed gear 32. The cam member 93 may a separate member with a central opening that extends around the spindle 30. The cam member 93 may also be part of the top axial face of the spindle feed gear 32. Each of the cam member 93 and the annular member 36 include one or more cam surfaces. The cam surfaces engage together during relative rotation of the cam member 93 and the annular member 36. During rotation of the spindle feed gear 32, the cam surfaces engage together to provide oscillation to the spindle 30.

The interchangeable spindle feed gears 32 provide for changing the feed rate of the spindle 30 without disassembling the entire gear head 14. Each spindle feed gear 32 is designed to engage with the differential feed gear 42 and provide a different feed rate to the spindle 30 when the different gears 32 are rotated at the same speed. Each spindle feed gear 32 includes a profile shift design that provides for multiple gear ratios on the same centers within established design limits. Each of the gears 32 is designed to accommodate the differential feed gear 42 that includes a given number of teeth 83. The different gears 32 may include different numbers of teeth and/or different teeth configurations that engage with the teeth 83. Thus the feed rate of the spindle 30 can be changed by just changing the gear 32.

The device 10 may include a variety of different spindle feed gears 32 dependent upon the number of required feed rates. In one or more embodiments, the different gears 32 each include a different number of teeth. In one or more embodiments, the different gears 32 each include different teeth configurations. In one or more embodiments, the different gears include different numbers of teeth and different teeth configurations. Each of the different gears 32 are configured to mount to the spindle 30 in a similar manner.

Using the example of FIG. 10, when an operator desires to change the feed rate, the operator removes the cover 54 from the opening 52 in the housing 50. This may include removing the one or more fasteners 55 that hold the cover 54 in position on the housing 50. The operator is then able to remove the spindle feed gear 32_a_ that is currently in use. This may also require the operator to remove one or more of the biasing member 37, annular member 36, and cam member 93.

The operator is then able to insert the second spindle feed gear 32_b_ and position it in the mounting position 53 to engage with the differential feed gear 42. The feed gear 32_b_ is further configured to engage with the spindle 30. The operator may then replace the other components that have been removed from the interior space. Once finished, the cover 54 is remounted to the housing and the gear head 14 is ready for use.

This design also provides for replacement of one or more of the biasing member 37 and the cam mechanism (formed by members 92, 93). The biasing member 37 may be replaced to change the thrust overload setting of the gear head 14. The cam mechanism may be replaced/removed for a different frequency or amplitude being applied to the spindle 30.

The various biasing members may include a variety of different configurations. The biasing members may include a single member, or multiple members. The multiple members may be the same or may be different. The members may include, but are not limited to Belleville washers, wave washers, wave springs and compression springs.

In one or more embodiments, the spindle rotation mechanism is formed by a driven differential drive gear 31 that engages with a spindle drive gear 41. The spindle 30 may also be rotated by a single gear that is powered by the motor 12 and also connected to the spindle 30.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A positive feed tool comprising:
   a housing that extends around an interior space;
   a spindle connected to the housing and movable relative to the housing along a feed path that extends through the housing;
   a spindle rotation mechanism positioned in the interior space of the housing and connected to the spindle to rotate the spindle;
   a differential feed gear positioned in the interior space of the housing and driven by the spindle rotation mechanism, the differential feed gear including gear teeth along an outer periphery;
   a mount position located in the interior space at the differential feed gear and the spindle;
   an opening in the housing that extends into the interior space;
   first and second spindle feed gears each configured to connect to the spindle and each including gear teeth positioned along an outer periphery to engage with the gear teeth of the differential feed gear, each of the spindle feed gears including a connector to connect to the spindle, each of the spindle feed gears being sized to fit through the opening in the housing;
   the mount position sized to receive just one of the first and second spindle feed gears at a time;
   with the first spindle feed gear mounted at the mount position and connected to the spindle and the differential feed gear, the first spindle feed gear including a first gear profile with a first number of teeth to move the spindle along the feed path at a first rate when the first spindle gear is rotated by the differential feed gear at a first speed;
   with the second spindle feed gear mounted at the mount position and connected to the spindle differential feed gear, the second spindle feed gear including a different second gear profile with a different second number of teeth to move the spindle along the feed path at a different second feed rate when the second spindle gear is mounted in the mount position and rotated by the differential feed gear at the first speed.

2. The feed tool of claim 1, wherein the opening is positioned in closer proximity to the mount position than the spindle rotation mechanism and the differential feed gear.

3. The feed tool of claim 1, further comprising a cover removably attached to the housing, the cover sized to extend across the opening.

4. The feed tool of claim 3, wherein the cover extends across the feed path and the spindle extends through an opening in the cover.

5. The feed tool of claim 1, further comprising a biasing member positioned in the interior space between a cover that extends across the opening and the mount position, the biasing member configured to apply a biasing force to the one of the first and second spindle feed gears that is located at the mount position.

6. The feed tool of claim 1, further comprising a cam mechanism positioned in the interior space between a cover that extends across the opening and the mount position, the cam mechanism configured to applying a oscillating force to the spindle during rotation of the spindle.

7. A method of operating a positive feed tool comprising:
   with a first spindle feed gear and a differential feed gear positioned within a housing of the feed tool and first gear teeth of the first spindle feed gear engaged with gear teeth of the differential feed gear and the first spindle feed gear connected to a spindle, rotating the differential feed gear at a first speed thereby rotating the first spindle feed gear and causing the spindle to move along a feed path at a first rate;
   removing the first spindle feed gear through an opening in the housing while the differential feed gear remains positioned within the housing;
   inserting a second spindle feed gear through the opening in the housing and engaging second gear teeth of the second spindle feed gear with the gear teeth of the differential feed gear and connecting the second spindle feed gear to the spindle; and
   rotating the differential feed gear at the first speed thereby rotating the second spindle feed gear and causing the spindle to move along the feed path at a second feed rate that is different than the first feed rate.

8. The method of claim 7, further comprising removing the first spindle feed gear through an opening in the housing while a spindle drive mechanism remains within the housing.

9. The method of claim 7, further comprising removing a biasing member from the interior space through the opening and inserting a replacement biasing member into the interior space, the replacement biasing member applying a different biasing force than the biasing member.

10. The method of claim 7, further comprising rotating the first spindle feed gear around the spindle and removing the first spindle feed gear through the opening.

11. The method of claim 7, further comprising maintaining the differential feed gear axially engaged with a drive gear while removing the first spindle feed gear through the opening and inserting the second spindle feed gear through the opening.

12. The method of claim 7, further comprising moving the spindle along the feed path and contacting a depth stop connected to the spindle against a stop member connected to the cover.

* * * * *